US012800864B2

(12) United States Patent
Mitobe

(10) Patent No.: US 12,800,864 B2
(45) Date of Patent: Nov. 17, 2026

(54) PULL-END ATTACHMENT STRUCTURE

(71) Applicant: Fujikura Ltd., Tokyo (JP)

(72) Inventor: Ryoichi Mitobe, Sakura (JP)

(73) Assignee: Fujikura Ltd., Tokyo (JP)

( * ) Notice: Subject to any disclaimer, the term of this patent is extended or adjusted under 35 U.S.C. 154(b) by 286 days.

(21) Appl. No.: 18/709,285

(22) PCT Filed: Jul. 13, 2022

(86) PCT No.: PCT/JP2022/027497
§ 371 (c)(1),
(2) Date: May 10, 2024

(87) PCT Pub. No.: WO2023/112370
PCT Pub. Date: Jun. 22, 2023

(65) Prior Publication Data

US 2025/0004237 A1 Jan. 2, 2025

(30) Foreign Application Priority Data

Dec. 14, 2021 (JP) ................................ 2021-202338

(51) Int. Cl.
*G02B 6/00* (2006.01)
*G02B 6/54* (2006.01)

(52) U.S. Cl.
CPC .................................. *G02B 6/545* (2023.05)

(58) Field of Classification Search
CPC . G02B 6/545; G02B 6/46; G02B 6/44; G02B 6/00; H02G 1/06; H02G 1/08
See application file for complete search history.

(56) References Cited

U.S. PATENT DOCUMENTS 4,317,185 A 2/1982 Thigpen et al.
6,151,432 A * 11/2000 Nakajima .......... G02B 6/38875 385/60

(Continued)

FOREIGN PATENT DOCUMENTS

JP 63-234204 A 9/1988
JP 8-122540 A 5/1996

(Continued)

OTHER PUBLICATIONS

International Search Report dated Oct. 4, 2022, issued in counterpart International Application No. PCT/JP2022/027497. (3 pages).

*Primary Examiner* — Jennifer Doan
(74) *Attorney, Agent, or Firm* — WHDA, LLP

(57) ABSTRACT

A pull-end attachment structure includes a cable having an optical fiber, a cylindrical dam case and fixed to the cable so as to surround the cable, a cylindrical member to which a pull-hose configured to accommodate an end portion of the optical fiber is attached and which is provided so as to surround an outer circumferential surface of the dam case, and a cylindrical fixing member provided so as to surround the cable and capable of fixing to the cylindrical member, in which an outer diameter of the fixing member is equal to or less than an outer diameter of the cylindrical member, and a contacting surface is formed on an inner circumferential surface of the fixing member, the contacting surface that contacts the dam case and transfers a pulling force to the dam case when the cylindrical member and the fixing member are pulled through the pull-hose.

3 Claims, 8 Drawing Sheets

(56) References Cited

U.S. PATENT DOCUMENTS

| | | | | |
|---|---|---|---|---|
| 10,197,739 | B2 * | 2/2019 | Ohtsuka ............... | G02B 6/3893 |
| 2012/0308184 | A1 | 12/2012 | Pina et al. | |
| 2022/0283382 | A1 * | 9/2022 | Mitobe ................ | G02B 6/4401 |

FOREIGN PATENT DOCUMENTS

| | | | |
|---|---|---|---|
| JP | 9-127345 | A | 5/1997 |
| JP | 2001-4888 | A | 1/2001 |
| JP | 2002-333561 | A | 11/2002 |
| JP | 3525343 | B2 | 5/2004 |
| JP | 2014-2189 | A | 1/2014 |
| KR | 10-2274367 | B1 | 7/2021 |

* cited by examiner

PULL-END ATTACHMENT STRUCTURE

TECHNICAL FIELD

The present invention relates to a pull-end attachment structure.

Priority is claimed on Japanese Patent Application No. 2021-202338, filed Dec. 14, 2021, the content of which is incorporated herein by reference.

BACKGROUND ART

In the related art, there is known a method for connecting a plurality of data centers by pulling a cable (optical cable) having an end portion to which a connector is attached to pass the cable through a thin duct provided in the ground. In this method, a so-called pull end, which is a portion to which an operator applies a pulling force, is attached to the cable. As a structure (hereinafter, referred to as a pull-end attachment structure) for attaching the pull end to the cable, generally, a structure is known in which a dam case fixed to the cable and the pull end are fixed by a plurality of bolts arranged at intervals in a circumferential direction.

In recent years, as optical cable networks have been expanded, it has become necessary to insert a plurality of cables into a thin duct. Patent Document 1 discloses a cable terminal structure in which a plurality of cables can be accommodated in a pull end by disposing a plurality of connectors to be shifted in a front-rear direction (axial direction).

CITATION LIST

Patent Document

[Patent Document 1] Japanese Unexamined Patent Application, First Publication No. 2002-333561

SUMMARY OF INVENTION

Technical Problem

By the way, when a cable is newly inserted into a thin duct in which a plurality of cables are already arranged, a sufficient space for inserting a pull end may not be secured, and there is a case where insertion of the pull end becomes difficult. In order to allow the pull end to be inserted even in such a limited space, it is preferable to reduce an outer diameter of the pull end.

However, even when the arrangement of objects accommodated in the pull end is improved as in Patent Document 1, it is difficult to realize a reduction in diameter of the pull end itself. Here, a method for reducing the diameter of the pull end by thinning the pull end is also conceivable. However, in the general pull-end attachment structure described above, the bolt also becomes smaller as the pull end is thinner, so that there is a possibility that sufficient attachment strength cannot be obtained. If the attachment strength is insufficient, the pull end may fall off from the cable when the pull end is pulled.

The present invention has been made in consideration of such circumstances, and an object of the present invention is to provide a pull-end attachment structure capable of achieving both a reduction in diameter of a pull end and securing attachment strength of the pull end with respect to a cable.

Solution to Problem

In order to solve the above problems, a pull-end attachment structure according to an aspect of the present invention includes a cable having an optical fiber, a dam case formed in a cylindrical shape and fixed to the cable so as to surround the cable, a cylindrical member to which a pull-hose configured to accommodate an end portion of the optical fiber is attached and which is provided so as to surround an outer circumferential surface of the dam case, and a fixing member formed in a cylindrical shape, provided so as to surround the cable, and capable of fixing to the cylindrical member, in which an outer diameter of the fixing member is equal to or less than an outer diameter of the cylindrical member, and a contacting surface is formed on an inner circumferential surface of the fixing member, the contacting surface that contacts the dam case and transfers a pulling force to the dam case when the cylindrical member and the fixing member are pulled through the pull-hose.

Advantageous Effects of Invention

According to the aspect of the present invention, it is possible to provide a pull-end attachment structure capable of reducing a diameter of a pull end and securing attachment strength of the pull end with respect to a cable.

DESCRIPTION OF EMBODIMENTS

Hereinafter, a pull-end attachment structure 1 according to an embodiment of the present invention will be described with reference to the drawings.

Figure 1:
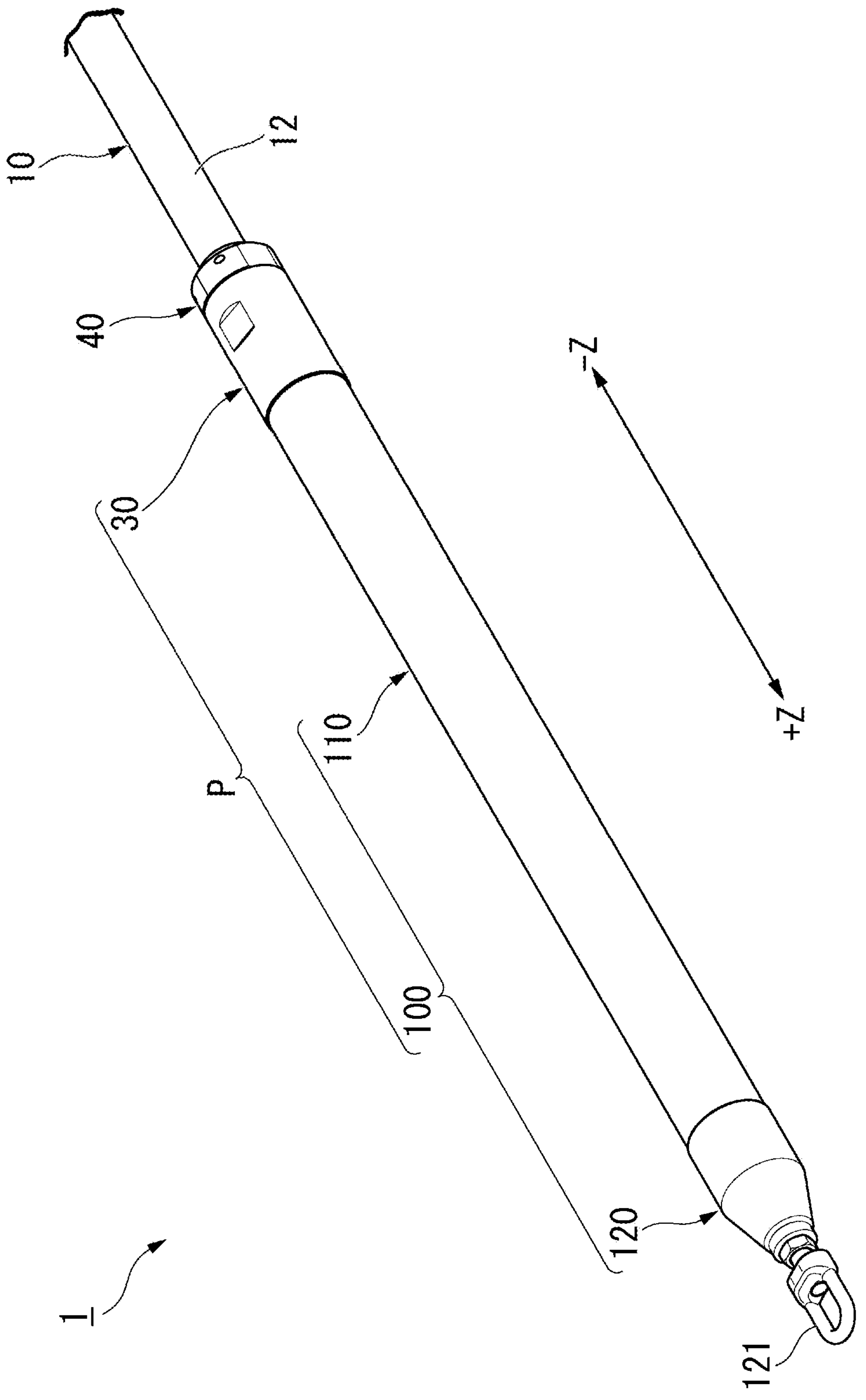
FIG. 1 is a perspective view showing a pull-end attachment structure according to an embodiment of the present invention.
Figure 2:
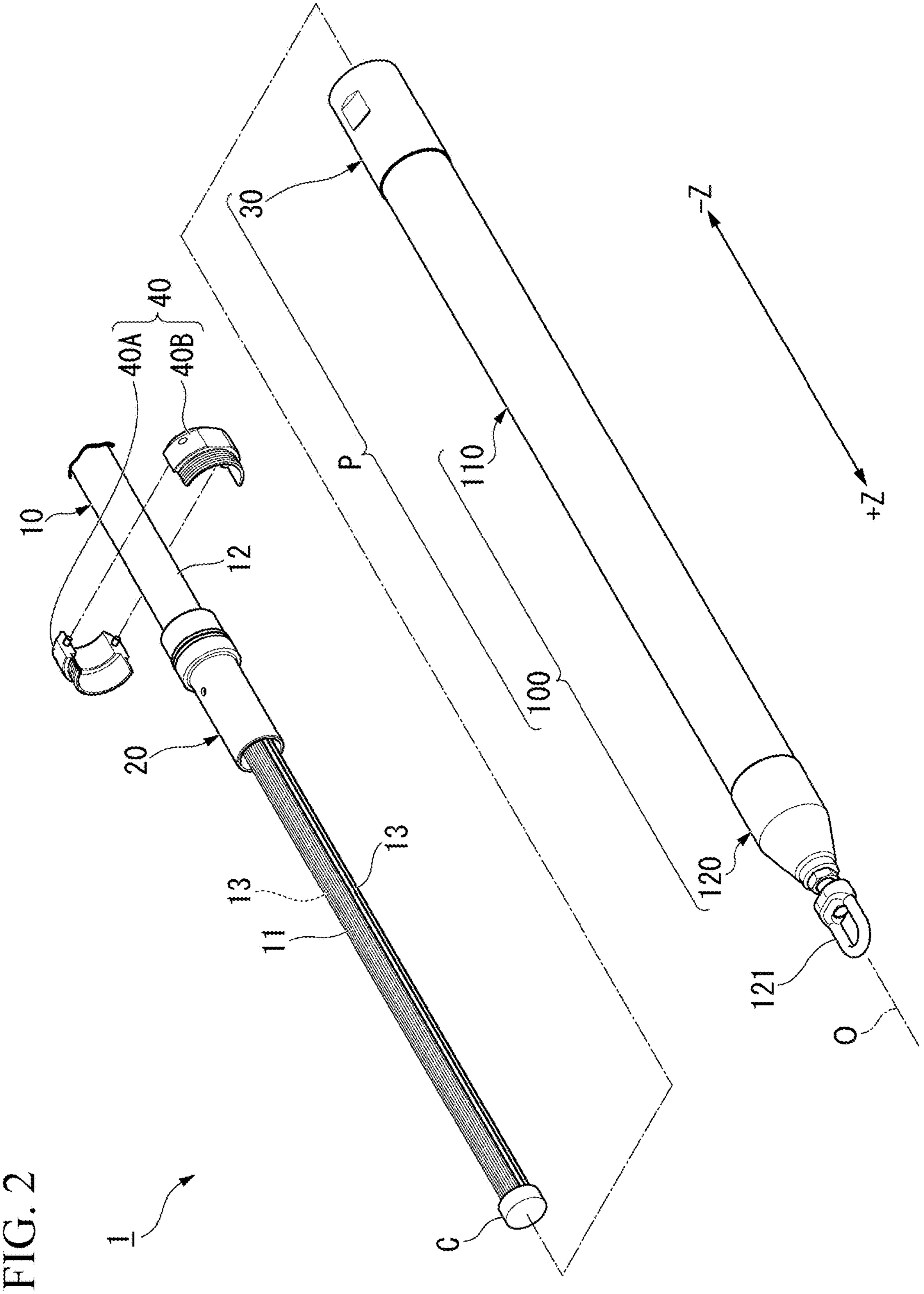
FIG. 2 is an exploded view showing the pull-end attachment structure according to the embodiment of the present invention.

As shown in FIGS. 1 and 2, the pull-end attachment structure 1 includes a cable (optical cable) 10, a dam case 20, a fixing member 40, and a pull end P. The pull end P according to the present embodiment includes a cylindrical metal fitting (cylindrical member) 30 and a pull-hose 100 attached to the cylindrical metal fitting 30 (see also FIG. 3). Each of the dam case 20, the cylindrical metal fitting 30, and the fixing member 40 according to the present embodiment is formed in a cylindrical shape that can be considered to have a common central axis O. Although descriptions thereof will be made in more detail later, the fixing member 40 is fixed to one end (proximal end) of the cylindrical metal fitting 30.

Direction Definition

Here, in the present embodiment, a direction parallel to the central axis O of the cylindrical metal fitting 30 or the like is referred to as a longitudinal direction Z, a Z direction, or an axial direction Z. A direction from the fixing member 40 toward the cylindrical metal fitting 30 along the axial direction Z is referred to as a +Z direction, a front side, or a distal end side. A direction opposite to the +Z direction is referred to as a −Z direction, a rear side, or a proximal end side. A direction orthogonal to the central axis O of the cylindrical metal fitting 30 or the like is referred to as a radial direction. Along the radial direction, a direction closer to the central axis O will be referred to as a radially inner side, and a direction away from the central axis O will be referred to as a radially outer side. A direction that orbits around the central axis O when viewed from the axial direction Z is referred to as a circumferential direction.

As shown in FIGS. 1 and 2, the pull-hose 100 includes a hose 110 extending in the axial direction Z and a pulling portion 120 attached to a distal end of the hose 110. A grip 121 is provided at a distal end of the pulling portion 120 according to the present embodiment. The grip 121 is a portion where an operator actually applies a pulling force when pulling the cable 10.

Figure 3:
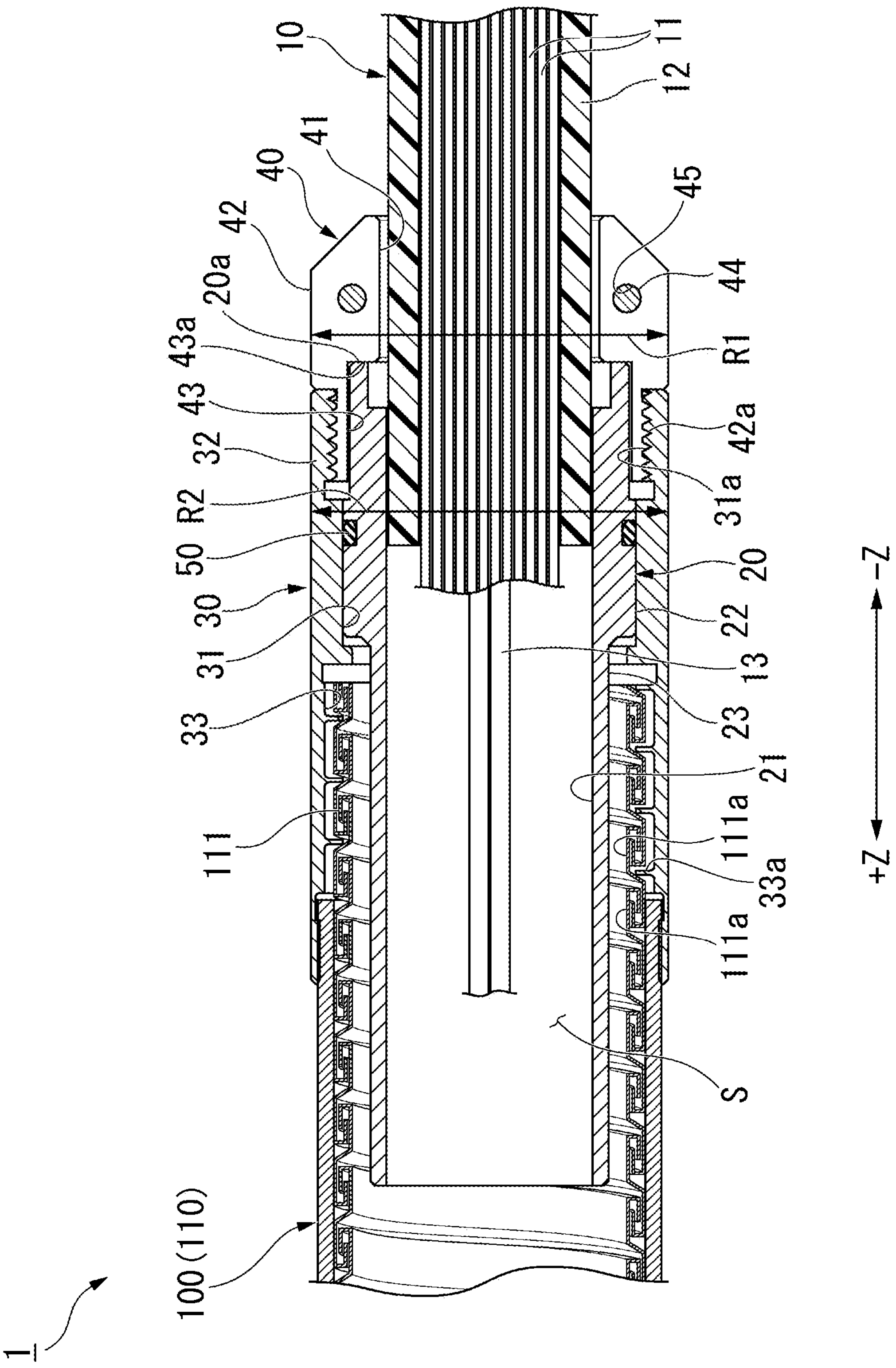
FIG. 3 is a sectional view taken along line III-III in FIG. 1.

As shown in FIG. 3, the hose 110 according to the present embodiment has a flexible structure 111 and is flexible. As the flexible structure 111, for example, a structure can be adopted in which a plurality of core wires (core plates) 111*a* having an S-shape in a cross-sectional view are spirally wound, and further the plurality of wound core wires 111*a* are connected to each other in the axial direction Z. As the core wire 111*a*, for example, a stainless steel (SUS) plate can be adopted. However, the structure of the flexible structure 111 is not limited to the above example as long as the flexible structure 111 has flexibility, and can be appropriately changed.

As shown in FIGS. 2 and 3, the cable 10 according to the present embodiment includes a plurality of optical fibers 11 extending in the axial direction Z, a sheath 12, and a plurality of tensile strength members 13. Each optical fiber 11 has a core (not shown) and a cladding (not shown). The optical fiber 11 may have, for example, only the core and the cladding. Alternatively, as the optical fiber 11, an optical fiber element wire in which the cladding is coated with a resin or the like may be adopted. Further, two or more optical fibers 11 may form a so-called optical fiber ribbon. That is, two or more optical fibers 11 may be collectively coated with resin or the like to have a tape shape.

The sheath 12 covers and coats the plurality of optical fibers 11 from the radially outer side. As the material of the sheath 12, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like may be used. Further, a compound (alloy, mixture) of the above resins may be used to form the sheath 12. A front end of the sheath 12 according to the present embodiment is located in the dam case 20.

As shown in the example of FIG. 2, a connector C may be attached to a distal end of the optical fiber 11. The connectors C may be attached to correspond to the optical fibers 11 one-to-one, or one connector C may be attached to two or more optical fibers 11. The distal end portion (connector C) of each optical fiber 11 is accommodated in the pull-hose 100.

The tensile strength member 13 according to the present embodiment is embedded in the sheath 12. Each tensile strength member 13 extends in the axial direction Z along the optical fiber 11. The tensile strength member 13 is a member having a higher spring constant or higher tensile strength in the axial direction Z than the sheath 12. As the material of the tensile strength member 13, for example, a metal wire (steel wire or the like), fiber reinforced plastic (FRP), or the like may be used. When the pulling force (tension) is applied to the cable 10 along the axial direction Z, the tensile strength member 13 has a role of receiving the pulling force and protecting the optical fiber 11. In the present embodiment, four tensile strength members 13 are disposed so as to sandwich the plurality of optical fibers 11 in the radial direction. The number and positions of the tensile strength members 13 are not limited to the shown example, and can be changed as appropriate.

As shown in FIGS. 2 and 3, the dam case 20 is disposed so as to surround the cable 10 from the radially outer side. Although not shown, the dam case 20 according to the present embodiment is fixed to the cable 10 by an adhesive injected into an internal space S of the dam case 20. More specifically, an inner circumferential surface 21 of the dam case 20 is adhered to the optical fibers 11, the sheath 12, and the tensile strength members 13 of the cable 10 by the adhesive. However, the fixing method is not limited to the adhesive fixing as long as the dam case 20 can be fixed to the cable 10, and can be appropriately changed.

As shown in FIG. 3, the cylindrical metal fitting (cylindrical member) 30 is provided so as to surround an outer circumferential surface 22 of the dam case 20 from the radially outer side. A recessed portion 33 that is recessed outward in the radial direction and is open forward is formed in an inner circumferential surface 31 of the cylindrical metal fitting 30 according to the present embodiment. Additionally, a spiral protrusion 33*a* that protrudes toward the radially inner side is formed on the recessed portion 33 of the cylindrical metal fitting 30.

As described above, the pull-hose 100 is attached to the cylindrical metal fitting 30. As shown in FIG. 3, the pull-hose 100 according to the present embodiment is attached to be accommodated in the recessed portion 33 of the cylindrical metal fitting 30. More specifically, the protrusion 33*a* formed on the recessed portion 33 of the cylindrical metal fitting 30 is inserted into the flexible structure 111 (between two core wires 111*a* adjacent to each other in the axial direction Z) of the hose 110, and thus, the hose 110 and the cylindrical metal fitting 30 are fixed to each other. However, the structure in which the pull-hose 100 is attached to the cylindrical metal fitting 30 is not limited to the above example, and can be appropriately changed.

Here, the outer circumferential surface 22 of the dam case 20 according to the present embodiment has a small diameter portion 23. An outer diameter of the small diameter portion 23 is smaller than an outer diameter of the outer circumferential surface 22 in the other portion. The small diameter portion 23 is formed in the distal end portion of the dam case 20. Since the small diameter portion 23 is formed in the dam case 20, the hose 110 and the dam case 20 are less likely to interfere with each other, and the deformation of the hose 110 is less likely to be hindered by the dam case 20.

As shown in FIG. 3, the pull-end attachment structure 1 according to the present embodiment includes an O-ring 50. The O-ring 50 is accommodated in a groove formed in the outer circumferential surface 22 of the dam case 20 and contacts the inner circumferential surface 31 of the cylindrical metal fitting 30. The O-ring 50 has a role of improving a waterproof property of the pull-end attachment structure 1. The O-ring 50 is made of an elastic material (for example, rubber).

As shown in FIG. 3, the fixing member 40 is provided so as to surround the cable 10 from the radially outer side. An outer diameter R1 of the fixing member 40 according to the present embodiment is substantially equal to an outer diameter R2 of the cylindrical metal fitting 30. The term "substantially equal" includes the case where the outer diameter R1 and the outer diameter R2 are equal to each other when manufacturing errors are eliminated. However, the outer diameter R1 may be equal to or less than the outer diameter R2. That is, an outer circumferential surface 42 of the fixing member 40 is located at the same position as the outer circumferential surface 32 of the cylindrical metal fitting 30 in the radial direction, or is located on the radially inner side of the outer circumferential surface 32 of the cylindrical metal fitting 30.

An accommodation recessed portion 43 that is recessed toward the radially outer side and is open forward is formed in an inner circumferential surface 41 of the fixing member 40 according to the present embodiment. The rear end of the dam case 20 is accommodated in the accommodation recessed portion 43 of the fixing member 40. In addition, the accommodation recessed portion 43 of the fixing member 40 includes a contacting surface 43*a* that faces forward. The contacting surface 43*a* faces a rear end surface 20*a* of the dam case 20 in the axial direction Z. Although the details will be described later, the contacting surface 43*a* contacts the dam case 20 and has a role of transferring a pulling force to the dam case 20 when the cylindrical metal fitting 30 and the fixing member 40 are pulled through the pull-hose 100.

A first threaded portion 42*a* is provided at a front end portion of the fixing member 40 according to the present embodiment. In the example shown in FIG. 3, the first threaded portion 42*a* is a so-called male screw and has a structure in which a spiral protrusion is formed on the outer circumferential surface 42. A second threaded portion 31*a* is provided at a rear end portion of the cylindrical metal fitting 30 according to the present embodiment. In the example shown in FIG. 3, the second threaded portion 31*a* is a so-called female screw, and has a structure in which a spiral groove is formed on the inner circumferential surface 31. The fixing member 40 is fixed to the cylindrical metal fitting 30 by fastening the first threaded portion 42*a* with the second threaded portion 31*a*. However, the second threaded portion 31*a* may be a male screw, and the first threaded portion 42*a* may be a female screw. That is, the second threaded portion 31*a* may be formed on the outer circumferential surface 32 of the cylindrical metal fitting 30, and the first threaded portion 42*a* may be formed on the inner circumferential surface 41 (accommodation recessed portion 43) of the fixing member 40.

Figure 4A:
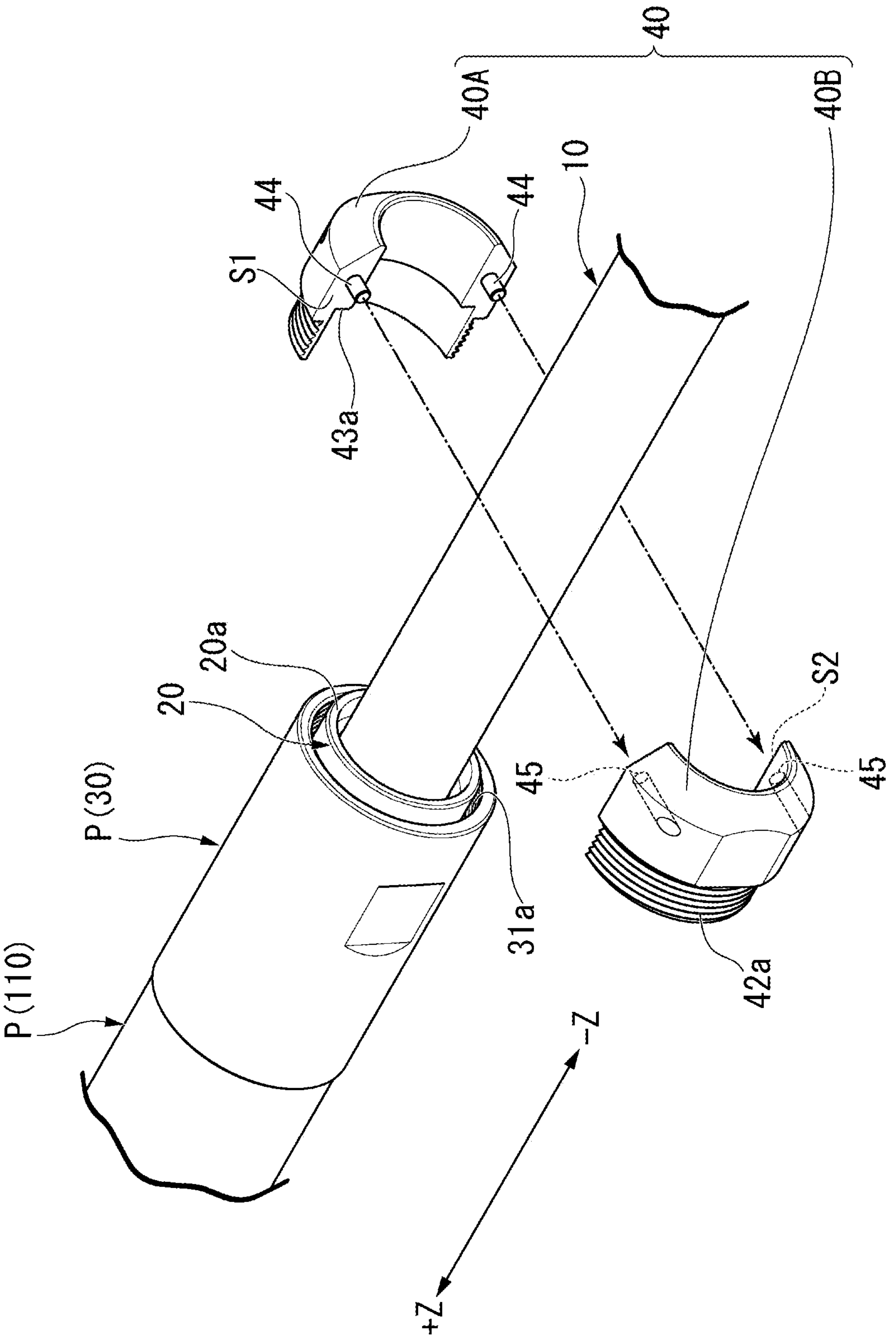
FIG. 4A is a view showing a method of attaching a fixing member to a cylindrical metal fitting according to the embodiment of the present invention.

As shown in FIGS. 2 and 4A, the fixing member 40 according to the present embodiment has a first member 40A and a second member 40B disposed so as to sandwich the cable 10 in the radial direction. The fixing member 40 is capable of being split into the first member 40A and the second member 40B. In other words, the fixing member 40 has a split structure. However, the fixing member 40 may not have the split structure. Hereinafter, the split structure will be described.

As shown in FIG. 4A, the first member 40A has a first facing surface S1 that faces the second member 40B (second facing surface S2) in the radial direction. The second member 40B has a second facing surface S2 that faces the first member 40A (first facing surface S1) in the radial direction. A pair of pins 44 protruding toward the second member 40B (second facing surface S2) are formed on the first facing surface S1. The pair of pins 44 are disposed so as to sandwich the cable 10 in the radial direction. In addition, a pair of pin holes 45 into which the pair of pins 44 are inserted are formed in the second facing surface S2.

The pin 44 is inserted into the pin hole 45, whereby the first facing surface S1 and the second facing surface S2 come into contact with each other, and the first member 40A and the second member 40B are fitted to each other. Further, since the pin 44 is inserted into the pin hole 45, the first member 40A and the second member 40B are prevented from shifting in the axial direction Z. Conversely, by removing the pin 44 from the pin hole 45, the fixing member 40 is split into the first member 40A and the second member 40B. The number and disposition of the pins 44 and the pin holes 45 are not limited to the example of FIG. 4A, and can be appropriately changed.

Next, an operation of the pull-end attachment structure 1 configured as described above will be described.

When the cable 10 is inserted into a duct or the like using the pull end P according to the present embodiment, an attachment step of attaching the pull end P to the cable 10, and a step of pulling the cable 10 via the pull end P are performed.

Figure 4B:
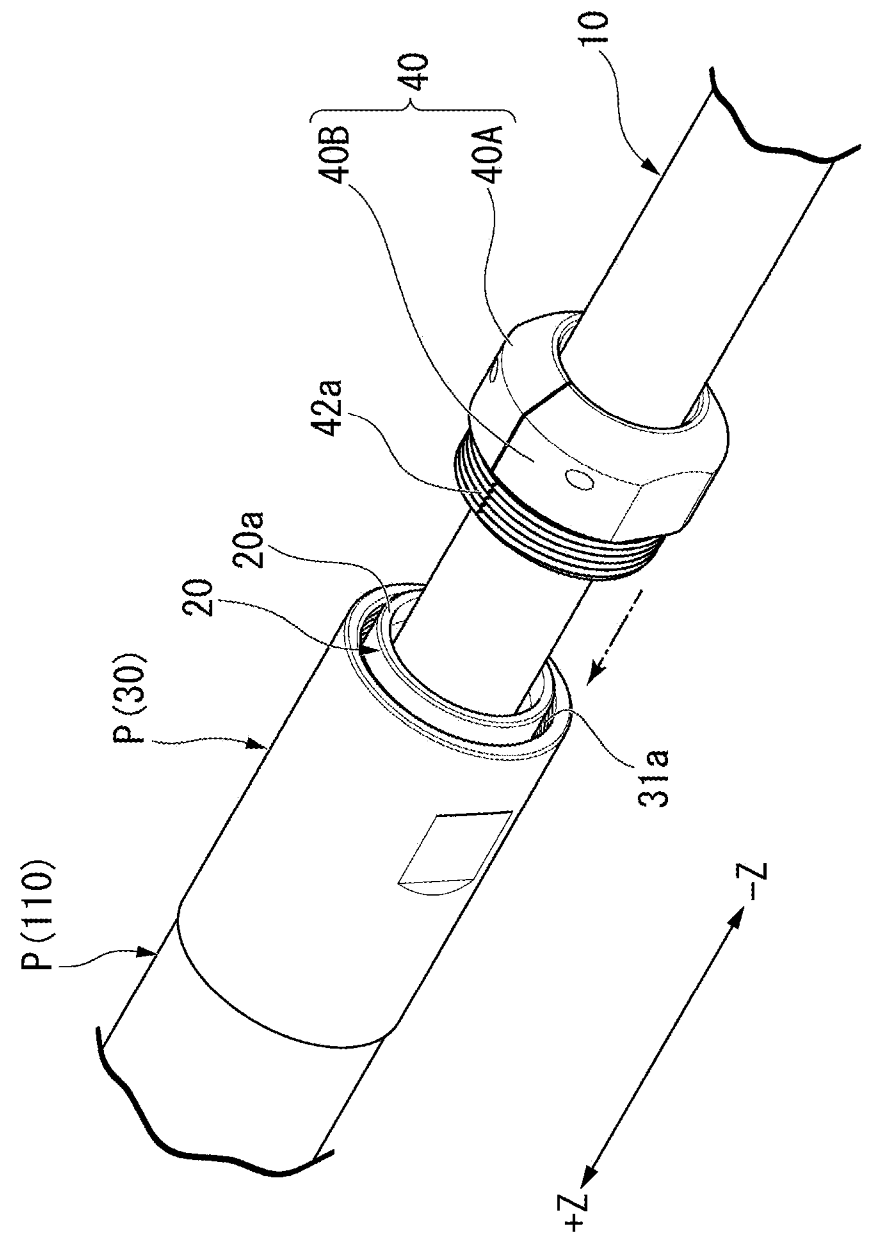
FIG. 4B is a view showing a state subsequent to FIG. 4A.
Figure 4C:
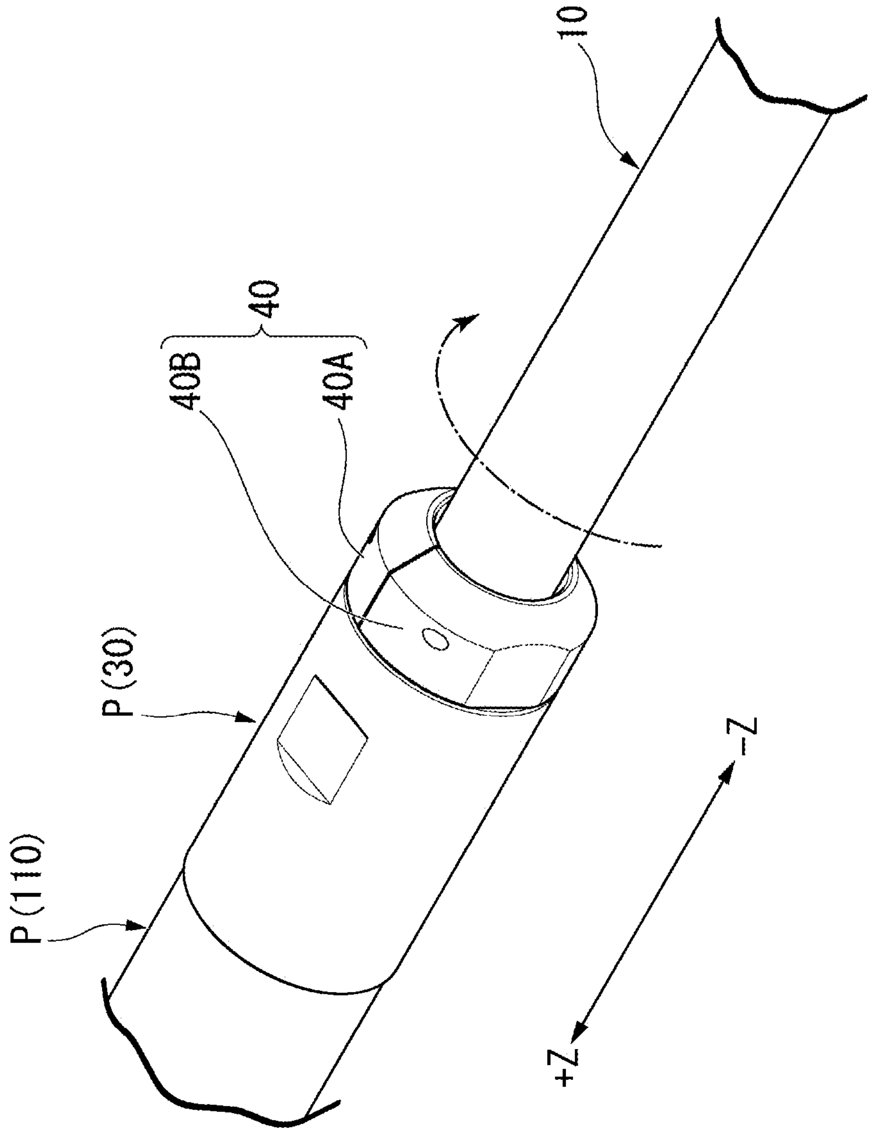
FIG. 4C is a view showing a state subsequent to FIG. 4B.

In the attachment step, first, the cable 10 is inserted into the pull end P from the rear end of the pull end P so that the dam case 20 and the cylindrical metal fitting 30 face each other in the radial direction (see FIGS. 2 and 4A). Next, as shown in FIGS. 4A and 4B, the first member 40A and the second member 40B are fitted to each other so that the cable 10 is interposed therebetween. Next, as shown in FIGS. 4B and 4C, the fixing member 40 is rotated with respect to the cylindrical metal fitting 30, and the first threaded portion 42*a* is screwed into the second threaded portion 31*a*. As a result, the fixing member 40 is fixed to the cylindrical metal fitting 30. Further, the screwing prevents the first member 40A and the second member 40B from unexpectedly separating from each other. By performing the above step, the pull end P and the fixing member 40 are fixed to each other, and the dam case 20 fixed to the cable 10 is accommodated in the accommodation recessed portion 43 of the fixing member 40 (see also FIG. 3).

After the attachment step is performed, the pulling step is performed. In the pulling step, for example, the grip 121 of the pulling portion 120 is pulled forward. Here, since the pulling portion 120, the hose 110, the cylindrical metal fitting 30, and the fixing member 40 are fixed to each other, the pulling portion 120, the hose 110, the cylindrical metal fitting 30, and the fixing member 40 are integrally pulled forward. In other words, the cylindrical metal fitting 30 and the fixing member 40 are pulled through the pull-hose 100. In this case, the contacting surface 43*a* of the fixing member 40 and the rear end surface 20*a* of the dam case 20 come into contact with each other (see also FIG. 3). Therefore, the pulling force directed forward is transferred to the dam case 20 via the contacting surface 43*a*. As a result, the dam case 20 and the cable 10 fixed to the dam case 20 are pulled forward.

Figure 4D:
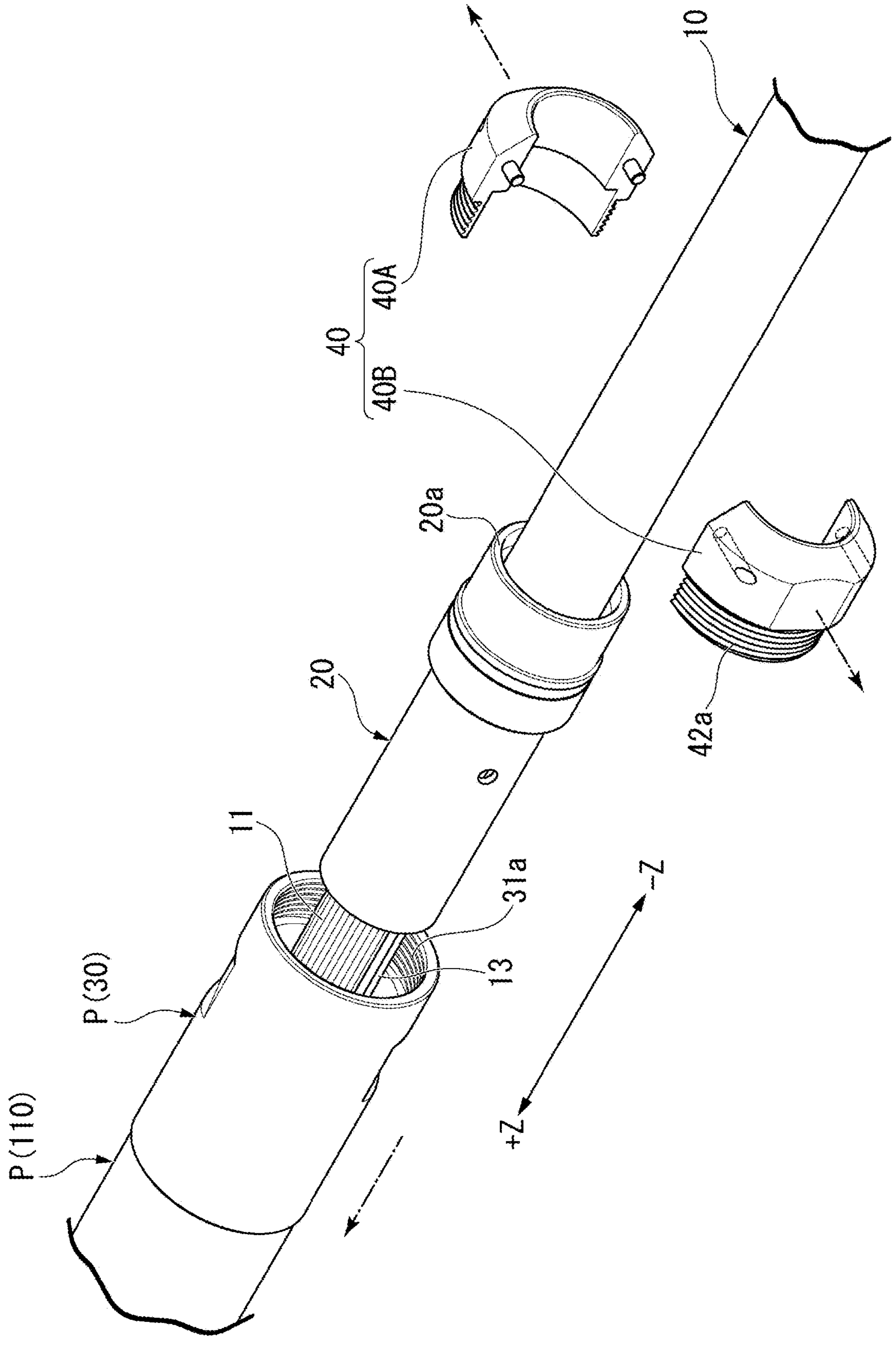
FIG. 4D is a view showing a state subsequent to FIG. 4C, and is a view showing a method of detaching the fixing member from a cable according to the embodiment of the present invention.

After pulling the cable 10 by the above method, the screwing between the first threaded portion 42*a* and the second threaded portion 31*a* may be released by rotating the fixing member 40 in the reverse direction with respect to the cylindrical metal fitting 30 (see FIG. 4D). As a result, the pull end P can be detached from the cable 10. By detaching the pull end P from the cable 10, the connector C (optical fiber 11) can be connected to an adapter provided in a data center or the like.

Further, as shown in FIG. 4D, the fixing member 40 may be split into the first member 40A and the second member 40B after the pull end P is detached from the cable 10. As a result, the fixing member 40 can be detached from the cable 10. Since the fixing member 40 has the split structure in this way, it is possible to prevent the fixing member 40 from remaining attached to the cable 10 after wiring in the data center or the like.

Meanwhile, as a pull-end attachment structure of the related art, a structure is generally known in which a dam case fixed to a cable and a pull end are fixed by a plurality of bolts disposed at intervals in a circumferential direction. In such a pull-end attachment structure, when a new cable is to be inserted into a thin duct in which a plurality of cables are already arranged, a sufficient space for inserting the pull end may not be secured, and there is a case where insertion of the pull end becomes difficult. In order to allow the pull end to be inserted even in a limited space, it is preferable to reduce an outer diameter of the pull end.

Here, a method of thinning of the pull end is conceivable in order to reduce the outer diameter of the pull end. However, in the general pull-end attachment structure described above, the bolt also becomes smaller as the pull end is thinner, so that there is a possibility that sufficient attachment strength cannot be obtained. If the attachment strength is insufficient, the pull end may fall off from the cable when the pull end is pulled. Further, it is conceivable to increase the number of bolts, but even in this method, the attachment strength may be unstable. The reason is as follows. That is, in a case in which loads applied to the plurality of bolts are non-uniform, the load is locally concentrated on a specific bolt, and there is a possibility that the bolt is damaged.

In the pull-end attachment structure 1 according to the present embodiment, the pull end P is attached to the cable 10 by the cylindrical fixing member 40 disposed so as to surround the cable 10. Here, the fixing member 40 according to the present embodiment is a member that is continuous in the circumferential direction, whereas the plurality of bolts are provided intermittently in the circumferential direction in the pull-end attachment structure in the related art. Therefore, a contact area where the fixing member 40 and the pull end P are in contact with each other can be made larger than a contact area where the bolt and the pull end are in contact with each other in the related-art structure. Therefore, according to the pull-end attachment structure 1 of the present embodiment, the attachment strength can be secured even in a case where the pull end P is thinned and reduced in diameter. That is, it is possible to achieve both the reduction in the diameter of the pull end P and the securing of the attachment strength of the pull end P to the cable 10.

Further, the outer diameter R1 of the fixing member 40 according to the present embodiment is equal to or less than the outer diameter R2 of the cylindrical metal fitting 30. As a result, when the cable 10 is pulled into the duct, the fixing member 40 and other cables in the duct or the like are less likely to interfere with each other. Therefore, the pulling work of the cable 10 can be made easier.

Further, in the pull-end attachment structure 1 according to the present embodiment, it is not necessary to screw a plurality of bolts. Therefore, as compared with the related-art structure, it is possible to reduce the time required to attach the pull end P to the cable 10 or detach the pull end P from the cable 10.

As described above, the pull-end attachment structure 1 according to the present embodiment includes the cable 10 having the optical fiber 11, the dam case 20 formed in a cylindrical shape and fixed to the cable 10 so as to surround the cable 10, the cylindrical metal fitting 30 to which the pull-hose 100 configured to accommodate the end portion of the optical fiber 11 is attached and which is provided so as to surround the outer circumferential surface 22 of the dam case 20, and the fixing member 40 formed in a cylindrical shape, provided so as to surround the cable 10, and capable of fixing to the cylindrical metal fitting 30, in which the outer diameter R1 of the fixing member 40 is equal to or less than the outer diameter R2 of the cylindrical metal fitting 30, and the contacting surface 43*a* is formed on the inner circumferential surface 41 of the fixing member 40, the contacting surface 43 that contacts the dam case 20 and transfers the pulling force to the dam case 20 when the cylindrical metal fitting 30 and the fixing member 40 are pulled through the pull-hose 100.

According to this configuration, the contact area where the fixing member 40 and the pull end P are in contact with each other can be made larger than the contact area where a bolt and a pull end are in contact with each other in the related-art structure. Therefore, it is possible to achieve both the reduction in the diameter of the pull end P and the improvement of the attachment strength of the pull end P to the cable 10.

Further, the fixing member 40 has the first threaded portion 42*a*, the cylindrical metal fitting 30 has the second threaded portion 31*a*, and the fixing member 40 is fixed to the cylindrical metal fitting 30 by fastening the first threaded portion 42*a* with the second threaded portion 31*a*. According to this configuration, the fixing member 40 can be reliably fixed to the cylindrical metal fitting 30 by fastening the first threaded portion 42*a* with the second threaded portion 31*a*.

Further, the first threaded portion 42*a* is a male screw, and the second threaded portion 31*a* is a female screw. With this configuration, the fixing member 40 can be more reliably fixed to the cylindrical metal fitting 30 by screwing the first threaded portion 42*a* which is a male screw into the second threaded portion 31*a* which is a female screw.

Further, the fixing member 40 has the first member 40A and the second member 40B disposed so as to sandwich the cable 10 in the radial direction, and is capable of being split into the first member 40A and the second member 40B. With this configuration, it is possible to prevent the fixing member 40 from remaining attached to the cable 10 after the optical fiber 11 is wired in the data center or the like.

Further, the first member 40A has the first facing surface S1 facing the second member 40B and the pin 44 protruding from the first facing surface S1 toward the second member 40B, the second member 40B has the second facing surface S2 facing the first member 40A and the pin hole 45 formed in the second facing surface S2, and the first member 40A and the second member 40B are fitted together by inserting the pin 44 into the pin hole 45. With this configuration, the shifting between the first member 40A and the second member 40B is suppressed, and the fixing member 40 can be more reliably fixed to the cylindrical metal fitting 30.

A technical scope of the present invention is not limited to the above-described embodiments, and it is possible to have various modifications be made within a scope that does not depart from the gist of the present invention.

Figure 5:
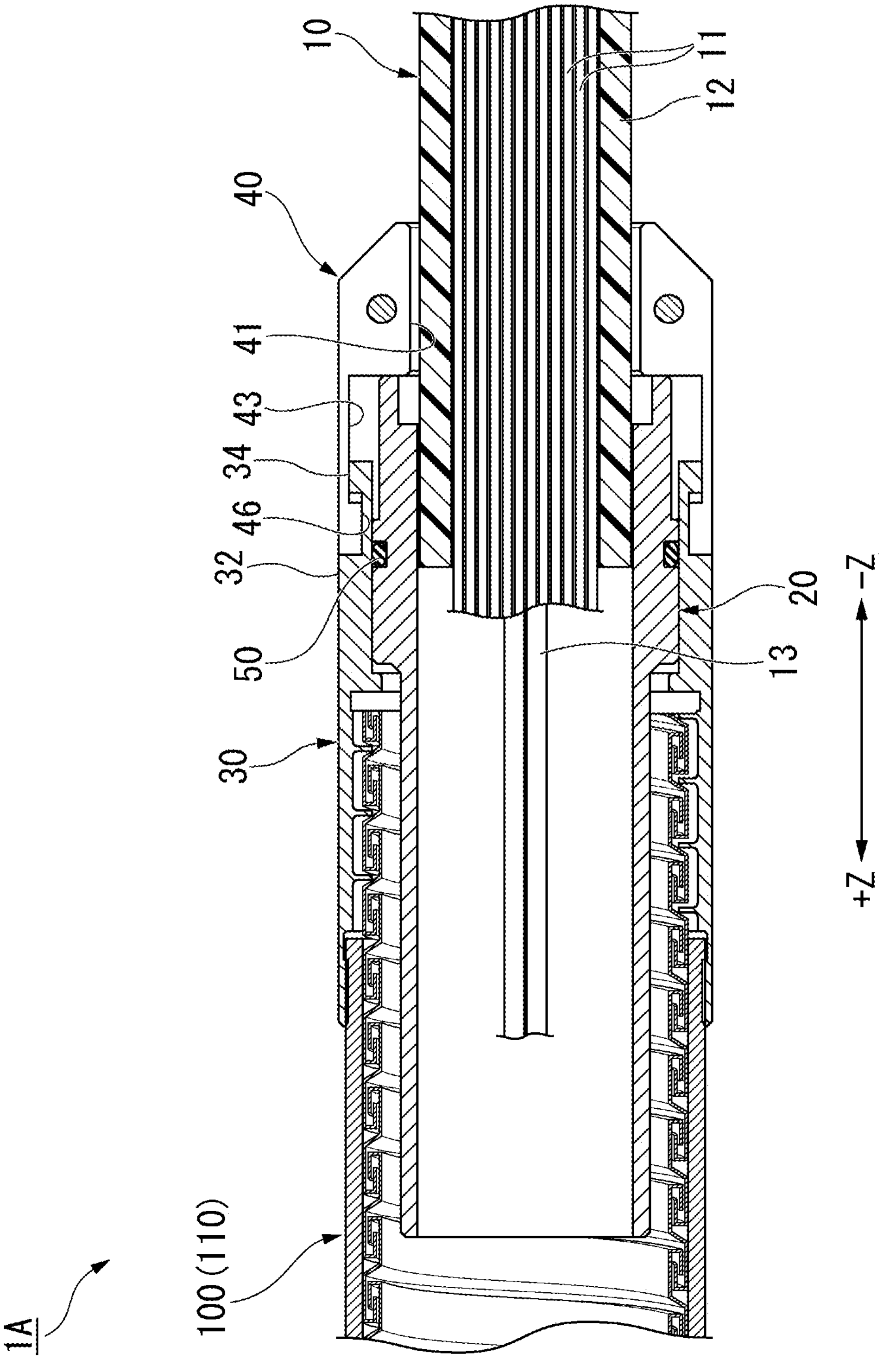
FIG. 5 is a sectional view showing a pull-end attachment structure according to a modification example of the present invention.

For example, in the above-described embodiment, the fixing member 40 is fixed to the cylindrical metal fitting 30 by screwing. However, a method for fixing the fixing member 40 to the cylindrical metal fitting 30 is not limited to the screwing. As an example, as in a pull-end attachment structure 1A shown in FIG. 5, a claw portion 46 may be provided instead of the first threaded portion 42*a*, and a hooking portion 34 may be provided instead of the second threaded portion 31*a*. The claw portion 46 protrudes toward the radially inner side from the inner circumferential surface 41 (accommodation recessed portion 43) of the fixing member 40. The hooking portion 34 protrudes toward the radially outer side from the outer circumferential surface 32 of the cylindrical metal fitting 30. In the pull-end attachment structure 1A, when the fixing member 40 is fixed to the cylindrical metal fitting 30, for example, the claw portion 46 can be elastically deformed and hooked on the hooking portion 34. Alternatively, when the fixing member 40 has a split structure as in the above embodiment, the first member 40A and the second member 40B may be fitted to each other so that the claw portion 46 and the hooking portion 34 mesh with each other.

Further, in the above embodiment, the cable 10 has the plurality of optical fibers 11, but the cable 10 may have only one optical fiber 11.

Further, the cylindrical member 30 may not be formed of metal.

Further, it is possible to appropriately replace the configuring components in the above-described embodiment with well-known configuring components, and the above-described embodiment and modification examples may be appropriately combined within a scope that does not depart from the gist of the present invention.

REFERENCE SIGNS LIST

1, 1A: Pull-end attachment structure
10: Cable
11: Optical fiber
20: Dam case
22: Outer circumferential surface
30: Cylindrical metal fitting (cylindrical member)
31*a*: Second threaded portion
40: Fixing member
40A: First member
40B: Second member
41: Inner circumferential surface
42*a*: First threaded portion
43*a*: Contacting surface
44: Pin
45: Pin hole
S1: First facing surface
S2: Second facing surface

The invention claimed is:

1. A pull-end attachment structure comprising:
a cable having an optical fiber;
a dam case formed in a cylindrical shape and fixed to the cable so as to surround the cable, wherein the dam case is fixed to the cable by an adhesive disposed in an internal space of the dam case;
a cylindrical member which is a cylindrical metal fitting, to which a pull-hose configured to accommodate an end portion of the optical fiber is attached, and which is provided so as to surround an outer circumferential surface of the dam case;
a fixing member formed in a cylindrical shape, provided so as to surround the cable, and capable of fixing to the cylindrical member; and
an O-ring which is accommodated in a groove formed in the outer circumferential surface of the dam case and contacts an inner circumferential surface of the cylindrical member,
wherein an outer diameter of the fixing member is equal to or less than an outer diameter of the cylindrical member,
a contacting surface is formed on an inner circumferential surface of the fixing member, the contacting surface that contacts the dam case and transfers a pulling force to the dam case when the cylindrical member and the fixing member are pulled through the pull-hose,
the fixing member has a first member and a second member disposed so as to sandwich the cable in a radial direction,
the fixing member is capable of being split into the first member and the second member,
the fixing member has a first threaded portion,
the cylindrical member has a second threaded portion, and
the fixing member is fixed to the cylindrical member by fastening the first threaded portion with the second threaded portion.

2. The pull-end attachment structure according to claim 1, wherein
the first threaded portion is a male screw, and
the second threaded portion is a female screw.

3. The pull-end attachment structure according to claim 1, wherein
the first member has a first facing surface facing the second member and a pin protruding from the first facing surface toward the second member,
the second member has a second facing surface facing the first member and a pin hole formed in the second facing surface, and
the first member and the second member are fitted together by inserting the pin into the pin hole.

* * * * *